United States Patent [19]

Lawrence, Jr.

[11] Patent Number: 4,947,797
[45] Date of Patent: Aug. 14, 1990

[54] DISPOSAL BIRD FEEDER

[76] Inventor: Robert H. Lawrence, Jr., 299 Cecilia Dr., Memphis, Tenn. 38117

[21] Appl. No.: 203,127

[22] Filed: Jun. 7, 1988

[51] Int. Cl.$^5$ .............................................. A01K 39/00
[52] U.S. Cl. ................................... 119/52.2; 119/57.8; 229/103
[58] Field of Search ...................... 119/23, 51 R, 52 R, 119/52.2, 57.8; 229/103, 901; 206/216, 806

[56] References Cited

U.S. PATENT DOCUMENTS

| | | | |
|---|---|---|---|
| 1,861,206 | 5/1932 | Burgess | 229/103 |
| 2,042,799 | 6/1936 | Ort | 206/806 X |
| 2,235,959 | 3/1941 | Copeman | 119/51 R |
| 2,556,661 | 6/1951 | Rendall et al. | 119/52 R |
| 2,556,707 | 6/1951 | Rendall et al. | 119/23 X |
| 2,746,665 | 5/1956 | Wiggins | 119/52 R X |
| 2,858,801 | 11/1958 | Chance | 119/52 R |
| 2,891,711 | 6/1959 | Early | 119/51 R |
| 3,089,462 | 5/1963 | Brockmann | 119/52.2 |
| 3,115,865 | 12/1963 | Parkes et al. | 119/52.2 |
| 3,602,196 | 8/1971 | Tucci | 119/51 R X |
| 4,030,451 | 6/1977 | Miller | 119/63 |
| 4,233,941 | 11/1980 | Webster | 119/52 R |
| 4,838,205 | 6/1989 | Larson | 119/52.2 |

*Primary Examiner*—John Weiss
*Attorney, Agent, or Firm*—Morton J. Rosenberg; David I. Klein

[57] ABSTRACT

A disposable bird feeder (10) is convertible from a bird seed container configuration (20). Disposable bird feeder (10) includes a reversibly deployable panel system (50) deployable from a position enclosing at least a portion of the receptacle housing (60) with which it is in substantially contiguous contact, to a deployed position extending radially outward at a predetermined angle from receptacle housing (60), defining a bird feeder configuration. Additionally, reversibly deployable panel system (50) includes an integrally formed stiffener (90) foldably engageable with reversibly deployable panel system (50).

14 Claims, 5 Drawing Sheets

DISPOSAL BIRD FEEDER

BACKGROUND OF THE INVENTION

1. Field of the Invention

This invention directs itself to disposable bird feeders packaged to serve as a bird seed container and being convertible to a bird feeder. In particular, this invention directs itself to a disposable bird feeder having a reversibly deployable panel system, a portion of which is fixably coupled to a bird seed containing receptacle. Further, this invention directs itself to a disposable bird feeder wherein the reversibly deployable panel system includes an integrally formed stiffener for maintaining the panel system in a fully deployed position. Still further, this invention directs itself to a disposable bird feeder where the reversibly deployable panel system defines a package for containing bird seed when foldably positioned in contiguous contact with, and at least partially enclosing, the bird seed receptacle. More in particular, this invention pertains to a disposable bird feeder having a reversibly deployable panel system in the form of a roof panel and/or trough panel deployable to a bird feeder configuration by extension of the roof and/or trough panels radially outward from the bird seed receptacle.

2. Prior Art

Disposable bird feeders are well known in the art. The best prior art known to the Applicant include U.S. Pat. Nos. 2,775,226; 2,340,976; 2,556,707; 1,951,515; 3,198,172; 3,441,002; 3,945,344; 4,242,984; 2,197,721; 4,606,298; 2,666,414; 3,250,249; Design No. 252,643; and, Design No. 278,169.

Some prior art systems such as that shown in U.S. Pat. Nos. 2,775,226 and 3,441,002 are directed to disposable bird feeders convertible from a bird seed container having quadrilateral contours. Such prior art systems provide tabs or flaps integrally formed in at least one container wall for allowing birds to access the feed. However, these prior art systems require attachments to create a perch for the birds. These attachments must be separately packaged or removed from one portion of the bird seed container and then reapplied to the package for conversion to a bird feeder.

In other prior art systems, such as U.S. Pat. No. 3,198,172 and U.S. Design Patent No. 254,643, supplemental roof panels are provided which must be added to quadrilateral housings. These roof panels in such prior art systems do not allow for a convenient package with the roof panel folded in contiguous contact with the housing, as provided by the instant invention. Further, these prior art systems do not provide for a feeding trough and perch foldably coupled to a housing and deployable therefrom. Thus, these prior art systems do not provide a unitary packaging structure for containing bird seed for commercial distribution to end users who then deploy disposable bird feeders from these packages.

SUMMARY OF THE INVENTION

A disposable bird feeder including a housing constructed from a single blank for containing a quantity of bird seed. The housing has closures at both the top and bottom ends, with the closure at the top end being adapted for suspending the container thus formed. The housing also includes at least one tab member integrally formed in at least one wall of the housing to allow bird seed to flow out of the housing. The disposable bird feeder includes a trough panel foldably coupled to the bottom end of the housing for dispensing the bird seed and forming a perch. The disposable bird feeder further includes a roof panel foldably coupled to the top end of the housing for shielding the bird seed dispensed within the trough panel.

DESCRIPTION OF THE PREFERRED EMBODIMENTS

Figure 1:
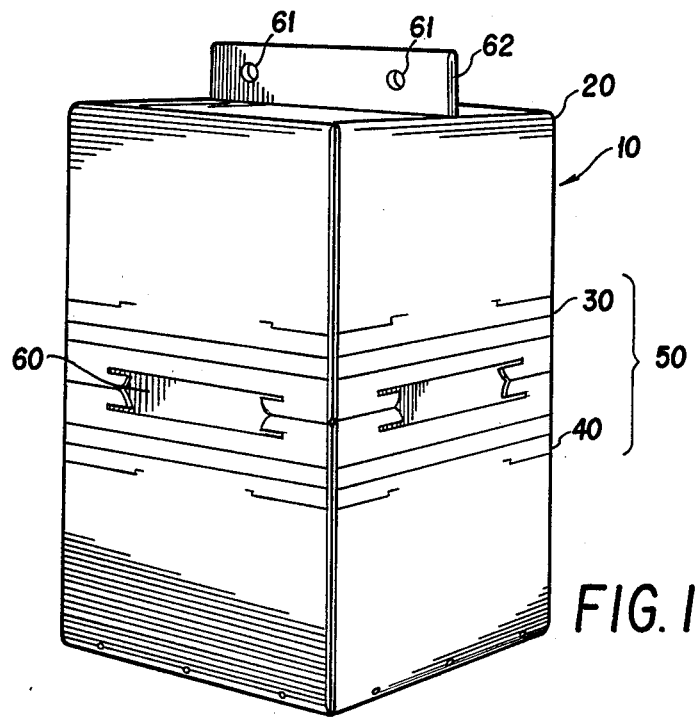
FIG. 1 is a perspective view of the disposable bird feeder configured as a container.

Referring now to FIGS. 1–5, there is shown disposable bird feeder 10 convertible from a bird seed container. As will be seen in following paragraphs, disposable bird feeder 10 is specifically directed to the concept of providing a unique packaging system for bird seed wherein the container includes reversibly deployable panels 50 for converting the bird seed container into a bird feeder having a roof 30 and bird seed trough 40. Disposable bird feeder 10 is normally supplied with reversibly deployable panel system 50 folded so as to be in substantially contiguous contact with the receptacle housing 60, defining the bird seed container 20. Bird seed container 20 provides a packaging system which is attractive, easily handled, and inexpensive. Additionally, the conversion from bird seed container 20 to a bird feeder is easily accomplished by unfolding the reversibly deployable panel system 50 to the deployed position to form a roof structure 30 and/or a trough structure 40, thus producing a bird feeder which is visually pleasing, convenient to use, and is simply disposed of when the bird seed has been consumed.

Referring now to FIG. 1, there is shown disposable bird feeder 10 configured as a bird seed container 20. The reversibly deployable panel system 50 is shown in a folded position and in substantially contiguous contact with the receptacle housing 60 containing the bird seed. The reversibly deployable panel system 50 in its folded position at least partially encloses receptacle housing 60 forming a package having a quadrilateral contour which is convenient for shipping and display of disposable bird feeder 10. Additionally, container 20 includes a centrally located vertically extending sealed portion 62 having a pair of apertures 61 formed therein. Sealed portion 62 forms a convenient means for suspending container 20 from rack type displays, as typically found in retail consumer outlets. Sealed portion 62 will also serve as the means from which disposable bird feeder 10 can be suspended when reversibly deployable panel system 50 is positioned for conversion from container 20 to a bird feeder.

Figure 2:
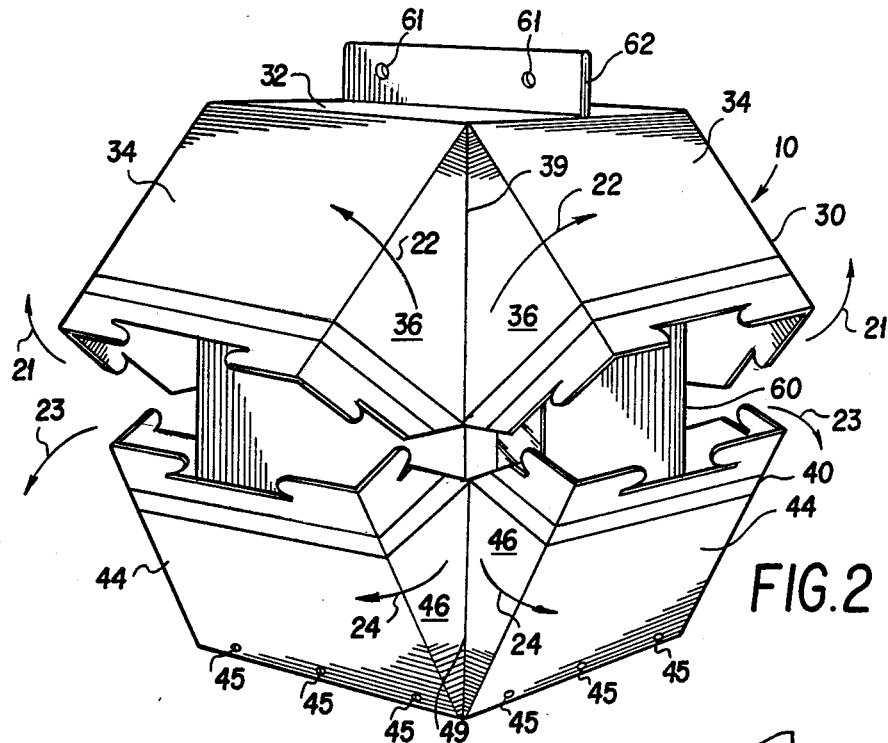
FIG. 2 is a perspective view of the disposable bird feeder in the midst of being deployed to the bird feeder configuration.

Referring now to FIG. 2, roof panel 30 and trough panel 40 are shown in the process of being unfolded for deployment. Roof panel 30 includes a central portion 32 which is fixably secured to the upper end of receptacle housing 60 by adhesive or like means. Extending from central portion 32 are a plurality of side panels 34 and a plurality of folded corner panels 36. One pair of folded corner panels 36 are located between any two side panels 34. Since receptacle housing 60 is of quadrilateral contour, roof panel 30 includes four side panels 34 with two folded corner panels 36, separated by a seam 39, located intermediate each of side panels 34.

Similarly, trough panel 40 is formed by four side panels 44 with two folded corner panels 46 located between each of the side panels 44. Each of the two folded corner panels 46 are separated by a seam 49 extending from the central portion 42 (not shown) to the outer edge of trough panel 40. Central portion 42 of trough panel 40 is fixably secured to the bottom end portion of receptacle housing 60 by adhesive or like means. Trough panel 40 also includes a plurality of apertures 45 formed in each of side panels 44 located adjacent the fold line which separates side panels 44 from central portion 42. Apertures 45 have a diameter of predetermined size for allowing any moisture which enters trough panel 40 to easily drain therefrom, while not permitting any bird seed to pass therethrough.

Deployment of roof panel 30 and trough panel 40 is easily accomplished by unfolding side panels 34 and folded corner panels 36, and side panels 44 and folded corner panels 46 of roof panel 30 and trough panel 40, respectively. Folded corner panels 36 of roof panel 30 are unfolded from behind one of side panels 34 as side panels 34 are lifted away from the receptacle housing 60 in a direction indicated by directional arrows 21. As roof panel 30 is deployed to its final position, folded corner panels 36 are unfolded in the direction indicated by directional arrows 22 until each folded corner panel 36 lies in the same plane as the adjacent side panel 34. Likewise, as trough panel 40 is unfolded such that side panels 44 are moved away from receptacle housing 60 in the direction indicated by directional arrows 23, folded corner panels 46 are moved out from behind one of the side panels 44. Folded corner panels 46 are then unfolded in the direction indicated by directional arrows 24 until each of the folded corner panels 46 lies in the same plane as the adjacent side panel 44.

Once roof panel 30 and trough panel 40 have been deployed, a means for retaining them in position must be provided to maintain the roof and trough structures in the position necessary for proper functioning of disposable bird feeder 10. A stiffener such as a small C-channel or structural angle could be added and secured to the perimeter of roof panel 30 and trough panel 40. However, in a preferred embodiment, each of roof panel 30 and trough panel 40 are provided with means 90 for stiffening panels 30 and 40. Stiffener 90 is integrally formed in roof panel 30 and trough panel 40, and foldably engageable therewith.

Figure 4:
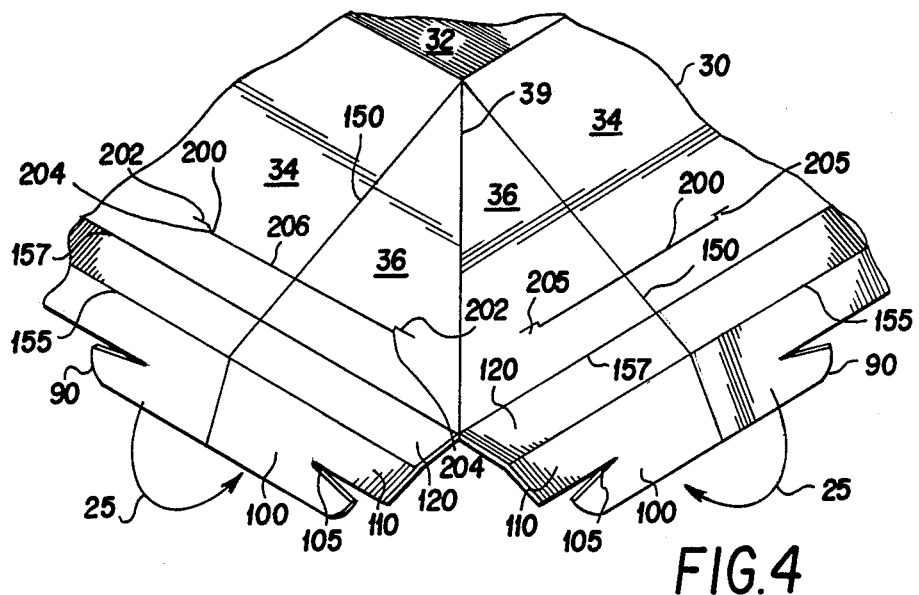
FIG. 4 is a cut-away perspective view of the roof panel prior to deployment of the integral stiffener.
Figure 5A:
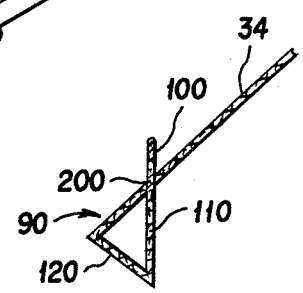
FIG. 5A is a sectional view of a stiffener as shown in FIG. 5.
Figure 5:
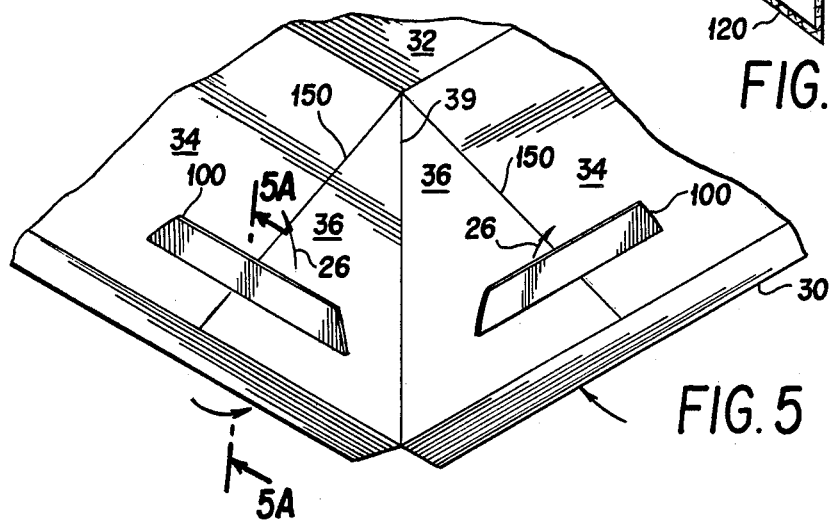
FIG. 5 is a cut-away perspective view of the roof panel and stiffener fully deployed.

Referring to FIGS. 4 and 5, there is shown means 90 by which roof panel 30 is maintained in its deployed position. It should be understood that trough panel 40 is similarly provided with an identical structure. As shown in the cut-away view of FIG. 4, each of side panels 34 of roof panel 30 extend from central portion 32 at a predetermined angle defined by the base dimension for the triangularly shaped folded corner panels 36. Folded corner panels 36 are defined by the intersection of fold lines 150 and 157 with seam 39, seam 39 defining the location where one folded panel 36 is fixably joined to the adjacent folded panel 36 by adhesive or like means. Roof panel 30 is maintained in a deployed position by maintaining folded corner panel 36 in the same place as its adjacent side panel 34, located adjacent fold line 150.

The integrally formed stiffeners 90 are defined by a pair of foldably engageable roof panel portions 110 and 120. Portion 120 extends from both side panel 34 and folded corner panel 36 at fold line 157. Extending from the opposing side of portion 120, at fold line 155, is located portion 110. Portion 110 includes a locking tab 100 for maintaining the stiffener 90 in folded engagement with side panels 34 and folded corner panels 36. Portions 110 and 120 are folded down under side panel 34 and its adjacent folded corner panels 36 in a direction indicated by directional arrow 25 until the locking tab 100 is able to pass through a slit 200 formed in a portion of both side panel 34 and the adjacent folded corner panel 36.

Slit 200 is formed by a longitudinal slit 206 extending equidistantly from fold line 150 to a portion of side panel 34 and folded corner panel 36. At opposing ends of slit 206 are orthogonally directed slits 204 which are formed intermediate slit 206 and each of a second pair of longitudinal slits 202. The orthogonally directed slits 202 and 204 define partial tab members 205 located on opposing ends of slit 206, providing a means for interlocking the tab 100 with side panel 34 and folded corner panel 36. Each of tabs 100 extend from panel 110 at a point 105 where the width of tab 100 is narrowest, for facilitating the tab-in-slot interlocking well-known in the packaging art.

Thus, with tabs 100 inserted into slits 200 in the direction indicated by direction arrow 26, as shown in FIG. 5, roof panel 30 is maintained in an outstretched deployed position. As shown in the sectional view of FIG. 5A, the integrally formed stiffener 90 has a triangular cross-section formed by a portion of panels 34 and 36, portion 120 and 110 with tab 100 passing through slit 200. Thus, stiffener 90 permits roof panel 30 and trough panel 40 to be deployed such that container 20 is converted to a conventional-looking bird feeder, as shown in FIG. 3.

Figure 9:
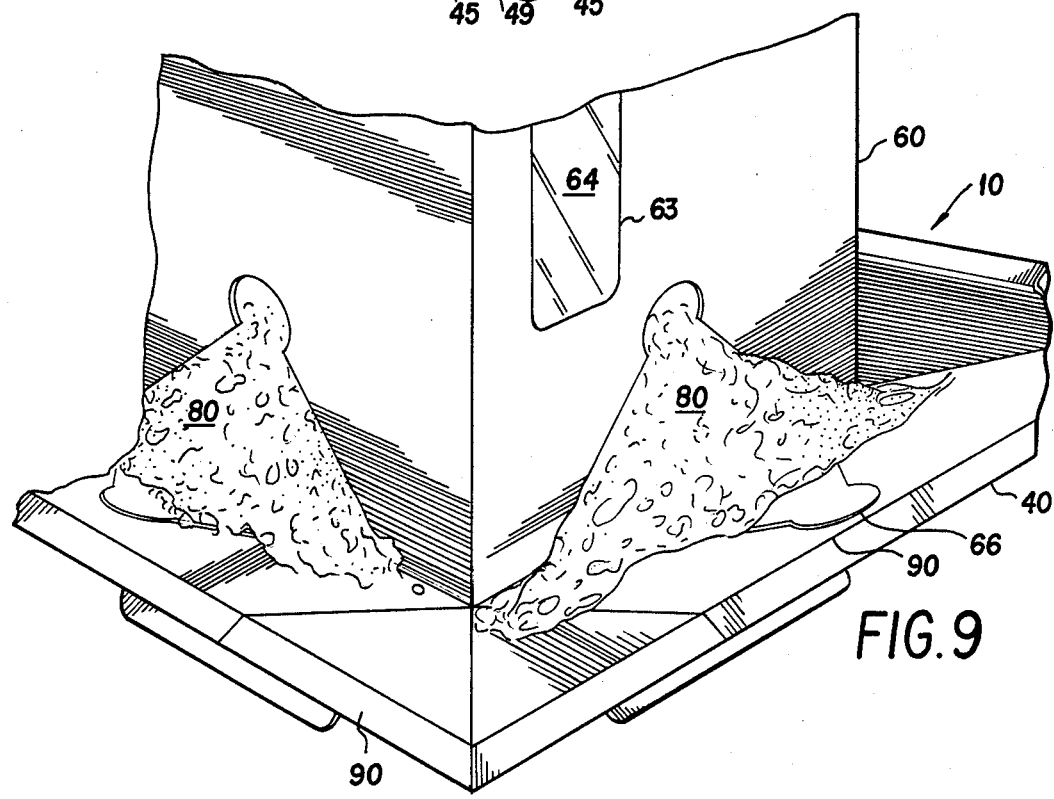
Figure 3:
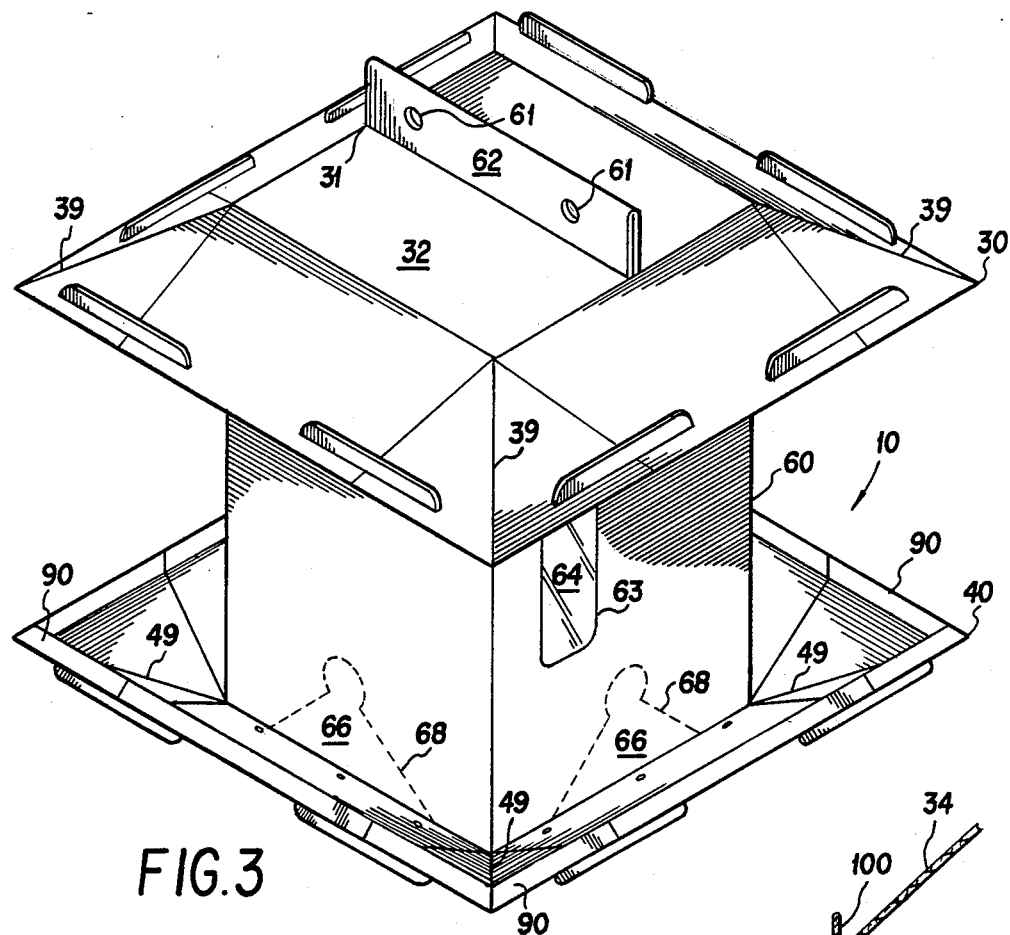
FIG. 3 is a perspective view of the disposable bird feeder in the fully deployed configuration.

Referring now to FIGS. 3 and 9, disposable bird feeder 10 is shown deployed in its bird feeder configuration. Although not important to the inventive concept, receptacle housing 60 includes at least one aperture 63, covered by a sheet of substantially transparent material 64 to form a window for viewing the level of the contents contained within receptacle housing 60. Access to the bird seed contained within receptacle housing 60 is provided by at least one integrally formed tab 66 formed in at least one wall of receptacle housing 60. Tab 66 is defined by a perforated outline 68, for permitting tab 66 to be easily separated from the receptacle housing wall. Tab 66 may be partially separated from receptacle housing 60, as shown in FIG. 9, such that it folds down until contact is made with trough panel 40, allowing bird seed 80 to flow from receptacle housing 60 to trough panel 40. In the alternative, tab 66 may be completely removed from receptacle housing 60. The stiffener 90, located along the perimeter of trough panel 40, acts as a perch, allowing birds easy access to the bird seed 80 which partially fills trough panel 40.

The sealed portion 62 of receptacle housing 60 extends through a slotted opening 31 formed in the central portion 32 of roof panel 30. Sealed portion 62 having at least one aperture 61 formed therein, provides a convenient means for suspending disposable bird feeder 10 in suitable locations by means of string, wire, or other suitable means.

Thus, as has been previously described, disposable bird feeder 10 is provided with a reversibly deployable panel system 50 foldably coupled to a receptacle housing 60 for being deployable from a position enclosing at least a portion of the receptacle housing 60, and being in substantially contiguous contact with receptacle housing 60. Reversibly deployable panel system 50 can be unfolded to a position extending radially outward from receptacle housing 60 for defining the bird feeder configuration of disposable bird feeder 10. Reversibly deployable panel system 50 may comprise a roof panel 30 and/or a trough panel 40, each having a central portion 32, 42 respectively, fixably coupled to opposing ends of receptacle housing 60. Additionally, both roof panel 30 and trough panel 40 include an integrally formed stiffener 90 for maintaining roof panel 30 and trough panel 40 in the deployed position. In the deployed position, both roof panel 30 and trough panel 40 extend radially outward from receptacle housing 60. Stiffener 90 is formed by folding portions 110 and 120 of roof panel 30 or trough panel 40 such that tab 100 is lockingly engaged with slit 200.

Obviously, if for any reason, it is desired to return roof panel 30 and/or trough panel 40 to its position enclosing a portion of receptacle housing 60, such is easily accomplished. Thus, if it is necessary to store disposable bird feeder 10 subsequent to deployment of reversibly deployable panel system 50, the procedure for deployment of roof panel 30 and/or trough panel 40 may simply be reversed. Thus, tabs 100 of stiffener 90 are removed from slits 200, panel portions 110 and 120 are unfolded, allowing roof panel 30 and/or trough panel 40 to be folded into substantially contiguous contact with a portion of receptacle housing 60, reestablishing the configuration of bird seed container 20.

Figure 6:
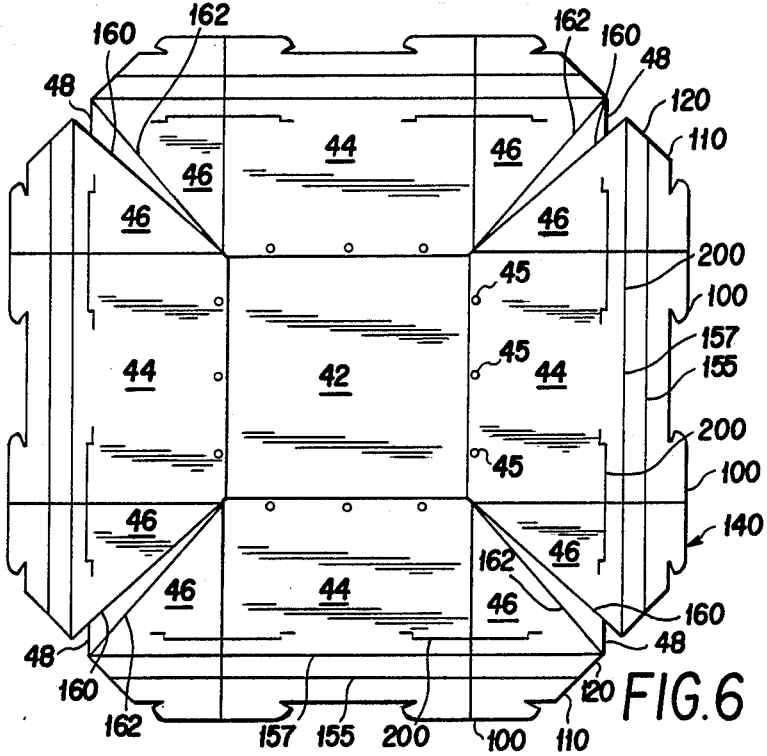
FIG. 6 is a plan view of a blank for forming the trough panel for the disposable bird feeder.
Figure 7:
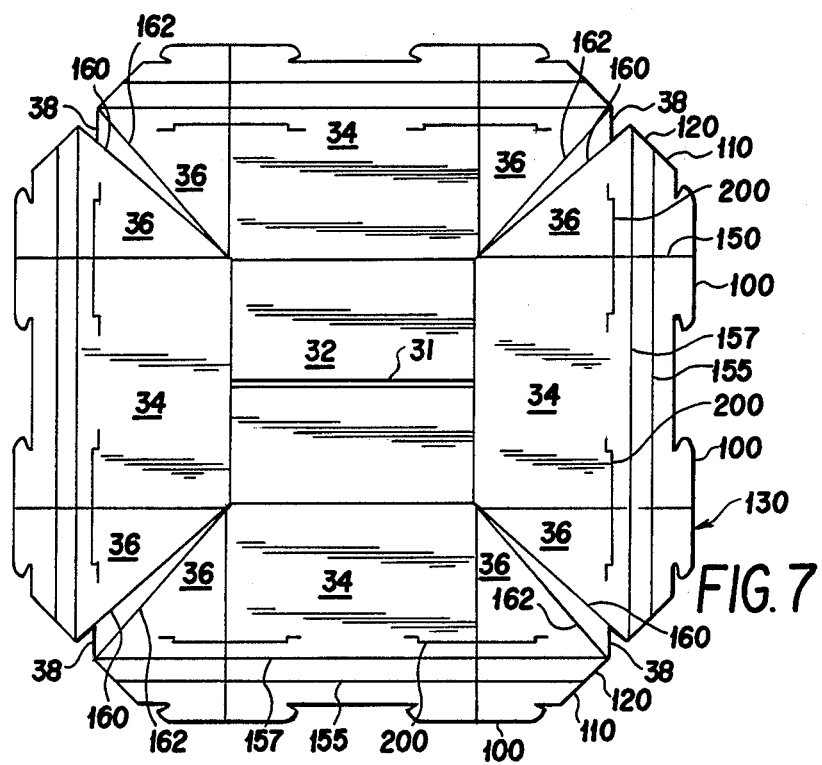
FIG. 7 is a plan view of the blank for forming the roof panel for the disposable bird feeder.

Referring now to FIGS. 6 and 7, there is shown blanks for the formation of reversibly deployable panel system 50. As shown in FIG. 6, blank 140, used to form trough panel 40, is preferably formed from a paperboard composition suitably waterproofed by a laminate film, resinous coating, or like technique, well-known in the art. Blank 140 is suitably scored and cut to provide central portion 42, four side panels 44, and six corner panels 46. Extending between each corner panel 46 and the adjacent side panel 44 is a slit 200 and a tab 100, whose function has been previously described. Each side panel 44 includes one or more apertures 45 located in close proximity to the score line defining the interface between central portion 42 and side panels 44. On each side of the blank 140, a portion 120 is defined between the score lines 157 and 155, and the portion 110 being defined between score line 155 and the periphery of the blank. Between each corner 46, there is provided a glue tab portion 48 extending from score line 162 to cut line 160. Glue tab portion 48 provides an overlap portion, to which adhesive is applied, for limiting the radial extension of trough panel 40 to a predetermined angle.

As shown in FIG. 7, blank 130, used to form roof panel 30, is preferably formed from a paperboard composition suitably waterproofed by a laminate film, resinous coating, or like technique, well-known in the art. Blank 130 is suitably scored and cut to provide central portion 32, four side panels 34, and six corner panels 36. Extending between each corner panel 36 and the adjacent side panel 34 is a slit 200 and a tab 100, whose function has been previously described. On each side of the blank 130, a portion 120 is defined between the score lines 157 and 155, and the portion 110 being defined between score line 155 and the periphery of the blank. Between each corner panel 36, there is provided a glue tab portion 38 extending from score line 162 to cut line 160. Glue tab portion 38 provides an overlap portion, to which adhesive is applied, for limiting the radial extension of roof panel 30 to a predetermined angle. Central portion 32 includes a longitudinal slot 31 bisecting central portion 32 and having a predetermined width to permit passage of receptacle housing sealed portion 62 to pass therethrough.

Figure 8:
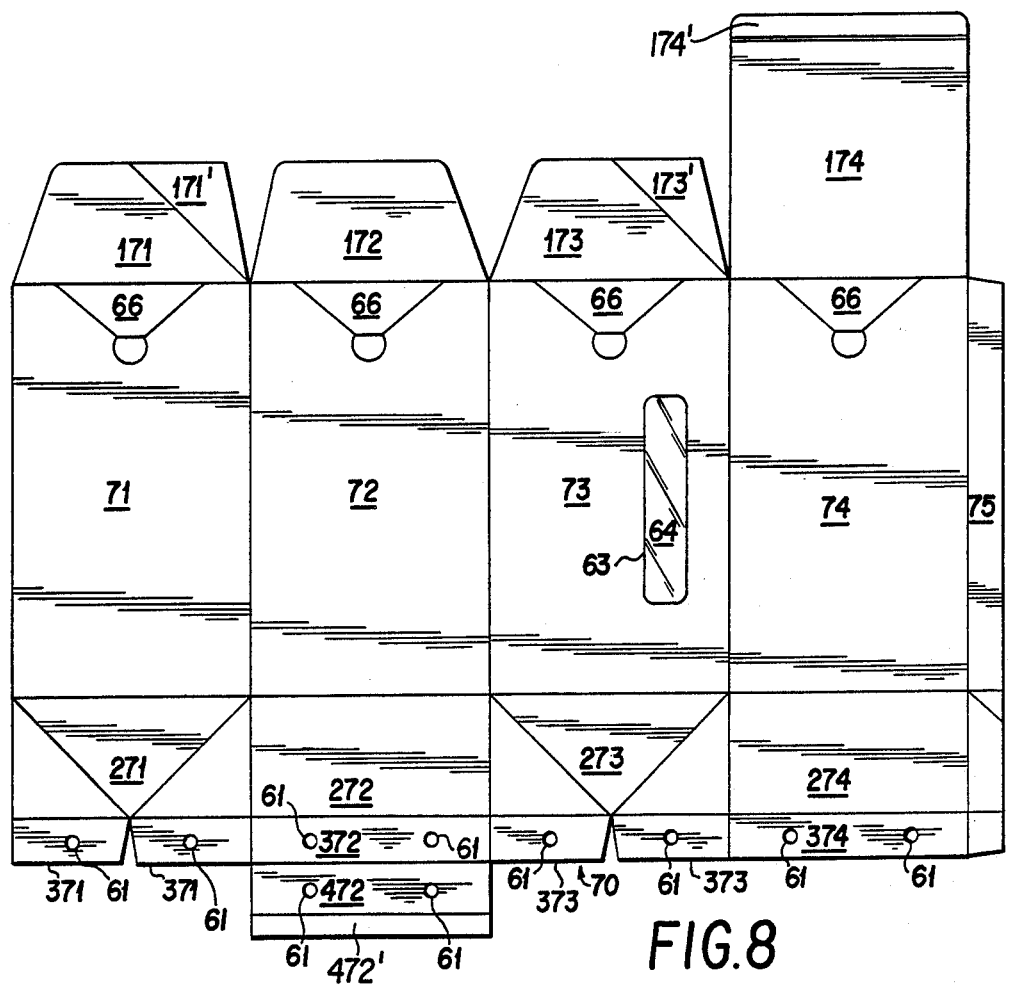
FIG. 8 is a plan view of the blank for forming the disposable bird feeder housing; and, FIG. 9 is a cut-away perspective view of the disposable bird feeder configured for feeding birds.

Referring now to FIG. 8, there is shown a blank 70 for forming a receptacle container 60. Blank 70 is preferably formed from paperboard and suitably waterproofed with a laminate film, resinous composition, or the like, as is well-known in the art. Blank 70 is suitably cut and scored to provide housing walls 71, 72, 73, and 74, and a glue flap 75. Each of the housing walls 71, 72, 73 and 74 are separated by a score line to facilitate folding of the blank into the quadrilateral tubular contour of receptacle housing 60. Bottom closure flaps 171, 172, 173, and 174 extend from the bottom edge of respective housing walls 71-74 to foldably form a bottom closure for the receptacle container 60. Bottom closure flaps 171, 173 and 174 each include respective glue tab portions 171', 173', and 174', defining areas to which adhesive is applied to seal the bottom closure for receptacle housing 60.

Each of housing walls 71-74 are shown provided with a tab 66 which has been perforately scored to facilitate easy separation from the respective housing wall. Additionally, housing wall 73 is provided with an aperture 63 covered by a substantially transparent material composition to provide a viewing window for receptacle housing 60.

The upper end of housing walls 71-74 are provided with top closure flaps 271, 272, 273, and 274. Each of top closure flaps 271-274 includes a glue flap 371, 372, 373, and 374, respectively. Top closure flap 272, in addition to glue flap 372 also includes additional glue flaps 472 and 472' suitably scored to fold over glue flaps 371, 373, and 374, so as to provide a suitably reinforced structure for the sealed portion 62 thus formed. Each of glue flaps 371, 372, 373, 374, and 472 include apertures 61, which when folded to form sealed portion 62 of receptacle housing 60, are aligned and overlay one another to provide holes for hanging disposable bird feeder 10.

Although this invention has been described in connection with specific forms and embodiments thereof, it will be appreciated that various modifications other than those discussed may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended Claims.

What is claimed is:

1. A disposable bird feeder, comprising:
   a. housing means constructed from a single blank for forming a container for bird seed having first and second opposing ends and a plurality of side walls, said first end being adapted for suspending said container therefrom, said housing means including at least one tab member integrally formed in at least one of said plurality of side walls of said housing means;
   b. trough means foldably coupled to said housing means second end for dispensing said bird seed and forming a perch, said trough means includes a first panel member having a central portion fixedly coupled to said housing means, said first panel member being unfoldably deployable from a first positional location to a second positional location; said first panel member when in (1) said first positional location substantially completely encompassing an outer contour of a lower portion of said housing means and in substantially contiguous contact therewith, and (2) said second positional location extending radially outward from each of said plurality of housing sidewalls; and,
   c. roof means foldably coupled to said housing means first end for shielding said dispensed bird seed, said roof means includes a second panel member having a central portion fixedly coupled to said housing means, said second panel member is unfoldably deployable from a first positional location to a second positional location; said second panel member when in (1) said first positional location substantially completely encompassing an outer contour of an upper portion of said housing means and in substantially contiguous contact therewith, and (2) said second positional location extending radially outward from each of said plurality of housing sidewalls.

2. The disposable bird feeder as recited in claim 1 wherein said trough means further includes first stiffening means coupled to said first panel member for maintaining said first panel member in said second positional location to receive said bird seed from an opening formed in said housing means by displacement of said tab member, said first stiffening means being formed by foldable distal perimeter portions of said first panel member.

3. The disposable bird feeder as recited in claim 1 wherein said roof means further includes second stiffening means coupled to said second panel member for maintaining said first panel member in said second positional location to form a weather shield for said combined housing means and said trough means, said second stiffening means being formed by foldable distal perimeter portions of said second panel member.

4. A disposable bird feeder convertible from a bird seed container, comprising:
   a. receptacle means for containing said bird seed, said receptacle means including a tubular housing member constructed from a single blank having first and second opposing ends for forming a closed volume space to contain said bird seed, said first end being adapted for suspending said bird feeder therefrom;
   b. reversibly deployable trough means fixedly coupled to said housing member second end for dispensing said bird seed, said trough means including a first panel member having a first positional location substantially completely encompassing an outer contour of a lower portion of said housing member and being in substantially contiguous contact therewith, said first panel member having a second positional location wherein a portion of said first panel member extends radially about said housing member, said trough means further including first stiffening means coupled to said first panel member for maintaining said first panel member in said second positional location, said first stiffening means being integrally formed in a distal perimeter portion of said first panel member, wherein said distal perimeter portion encompasses substantially all of said first panel member, said first stiffening means including at least a pair of foldably engageable portions of said panel member, a distal most one of said foldably engageable portions of said first panel member having at least one tab portion formed integrally therein for releasable engagement with a cooperating slotted through opening formed in said first panel member to define a polygonal cross-sectional closed contour; and
   c. reversibly deployable roof means fixedly coupled to said housing member first end for shielding said bird seed, said roof means including a second panel member having a first positional location substantially completely encompassing an outer contour of an upper portion of said housing member and being in substantially contiguous contact therewith, said second panel member having a second positional location wherein a portion of said second panel member extends radially about said housing member, said roof means further includes second stiffening means coupled to said second panel member for maintaining said second panel member in said second positional location, said second stiffening means being integrally formed in a distal perimeter portion of said first panel member, wherein said distal perimeter portion encompasses substantially all of said second panel member, said second stiffening means including at least a pair of foldably engageable portions of said second panel member, a distal most one of said foldably engageable portions of said second member having at least one tab portion formed integrally therein for releasable engagement with a cooperating slotted through opening formed in said second panel member to define a polygonal cross-sectional closed contour.

5. The disposable bird feeder as recited in claim 4 wherein said receptacle means includes at least one tab member integrally formed in at least one wall of said housing member and being displaceable therefrom for passage of said bird seed from said receptacle means to said trough means.

6. The disposable bird feeder as recited in claim 4 wherein said first panel member includes a plurality of openings located adjacent said housing member; said openings having a predetermined diameter for allowing moisture to pass therethrough while retaining said bird seed.

7. The disposable bird feeder as recited in claim 4 wherein said receptacle means includes at least one substantially transparent member coupled to a wall of said housing member; said substantially transparent member forming a closure for an opening formed in said wall for viewing said bird seed contained therein.

8. A packaging system serving as a bird seed container and being convertible to a disposable bird feeder, comprising:
   a. receptable means having a plurality of side walls for holding a supply of said bird seed previously inserted therein; and,
   b. reversibly deployable panel means coupled to said receptacle means for being deployable to a (1) first positional location substantially completely encompassing an outer contour of said receptacle means defined by a portion of each of said side walls of said receptacle means and in substantially contiguous contact therewith, and (2) second positional location extending radially outward from each of said side walls of said receptacle means for defining said disposable bird feeder.

9. The packaging system as recited in claim 8 wherein said combined receptacle means and said panel means in said first positional location are formed into a substantially quadrilateral contour.

10. The packaging system as recited in claim 9 wherein said panel means includes a trough member having a central portion fixedly coupled to said receptacle means.

11. The packaging system as recited in claim 9 wherein said panel means includes a roof member having a central portion fixedly coupled to said receptacle means.

12. The packaging system as recited in claim 10 wherein said panel means includes stiffening means coupled to said trough member for maintaining said deployment of said panel means in said second positional location; said stiffening means being formed integrally in said trough member and foldably engageable therewith.

13. The packaging system as recited in claim 11 wherein said panel means includes stiffening means coupled to said roof member for maintaining said deployment of said panel means in said second positional location; said stiffening means being formed integrally in said trough member and foldably engageable therewith.

14. The packaging system as recited in claim 9 wherein said receptacle means includes at least one tab member integrally formed in at least one wall of said receptacle means; said tab member being displaceable from said wall to permit said bird seed to pass therefrom.

* * * * *